United States Patent
Erstad

(10) Patent No.: US 7,702,949 B2
(45) Date of Patent: *Apr. 20, 2010

(54) USE OF NON-VOLATILE MEMORY TO PERFORM ROLLBACK FUNCTION

(75) Inventor: David Owen Erstad, Minnetonka, MN (US)

(73) Assignee: Micron Technology, Inc., Boise, ID (US)

( * ) Notice: Subject to any disclaimer, the term of this patent is extended or adjusted under 35 U.S.C. 154(b) by 226 days.

This patent is subject to a terminal disclaimer.

(21) Appl. No.: 11/857,325

(22) Filed: Sep. 18, 2007

(65) Prior Publication Data

US 2008/0059834 A1 Mar. 6, 2008

Related U.S. Application Data

(63) Continuation of application No. 11/434,497, filed on May 15, 2006, now Pat. No. 7,272,747, which is a continuation of application No. 10/188,724, filed on Jul. 2, 2002, now Pat. No. 7,058,849.

(51) Int. Cl.
*G06F 11/00* (2006.01)
(52) U.S. Cl. .............................. 714/5; 714/2
(58) Field of Classification Search .............. 714/5, 714/6–8, 13, 10, 2; 711/102, 104, 162
See application file for complete search history.

(56) References Cited

U.S. PATENT DOCUMENTS

| | | | |
|---|---|---|---|
| 4,263,664 A | 4/1981 | Owen et al. | |
| 4,300,212 A | 11/1981 | Simko | |
| 4,393,481 A | 7/1983 | Owen et al. | |
| 4,740,969 A | 4/1988 | Fremont | |
| 4,905,196 A | 2/1990 | Kirrmann | |
| 4,980,859 A | 12/1990 | Guterman et al. | |
| 5,157,663 A | 10/1992 | Major et al. | |
| 5,511,183 A | 4/1996 | Ohmido | |
| 5,574,874 A | 11/1996 | Jones et al. | |
| 5,664,088 A * | 9/1997 | Romanovsky et al. | ........ 714/13 |
| 5,737,514 A | 4/1998 | Stiffler | |
| 5,745,672 A | 4/1998 | Stiffler | |

(Continued)

OTHER PUBLICATIONS

USPTO; Office Action dated Jan. 25, 2005, from related U.S. Appl. No. 10/188,724, filed Jul. 2, 2002.

(Continued)

*Primary Examiner*—Dieu-Minh Le
(74) *Attorney, Agent, or Firm*—Knobbe Martens Olson & Bear LLP

(57) ABSTRACT

A mechanism and method for maintaining a consistent state in a non-volatile random access memory system without constraining normal computer operation is provided, thereby enabling a computer system to recover from faults, power loss, or other computer system failure without a loss of data or processing continuity. In a typical computer system, checkpointing data is either very slow, very inefficient or would not survive a power failure. In embodiments of the present invention, a non-volatile random access memory system is used to capture checkpointed data, and can later be used to rollback the computer system to a previous checkpoint. This structure and protocol can efficiently and quickly enable a computer system to recover from faults, power loss, or other computer system failure.

14 Claims, 5 Drawing Sheets

U.S. PATENT DOCUMENTS

| | | | |
|---|---|---|---|
| 5,751,939 A | 5/1998 | Stiffler | |
| 5,752,268 A | 5/1998 | Shimizu et al. | |
| 5,864,657 A | 1/1999 | Stiffler | |
| 5,913,021 A | 6/1999 | Masubuchi | |
| 5,948,112 A * | 9/1999 | Shimada et al. | 714/16 |
| 5,958,070 A | 9/1999 | Stiffler | |
| 5,966,322 A | 10/1999 | Pohm et al. | |
| 6,079,030 A | 6/2000 | Masubuchi | |
| 6,105,148 A * | 8/2000 | Chung et al. | 714/16 |
| 6,148,416 A | 11/2000 | Masubuchi | |
| 6,584,589 B1 * | 6/2003 | Perner et al. | 714/721 |
| 6,907,512 B2 * | 6/2005 | Hill et al. | 711/207 |
| 7,058,849 B2 | 6/2006 | Erstad | |
| 2003/0056143 A1 | 3/2003 | Prabhu | |
| 2004/0205469 A1 * | 10/2004 | Mellor | 715/500 |

OTHER PUBLICATIONS

USPTO; Office Action dated Jul. 14, 2005, from related U.S. Appl. No. 10/188,724, filed Jul. 2, 2002.

* cited by examiner

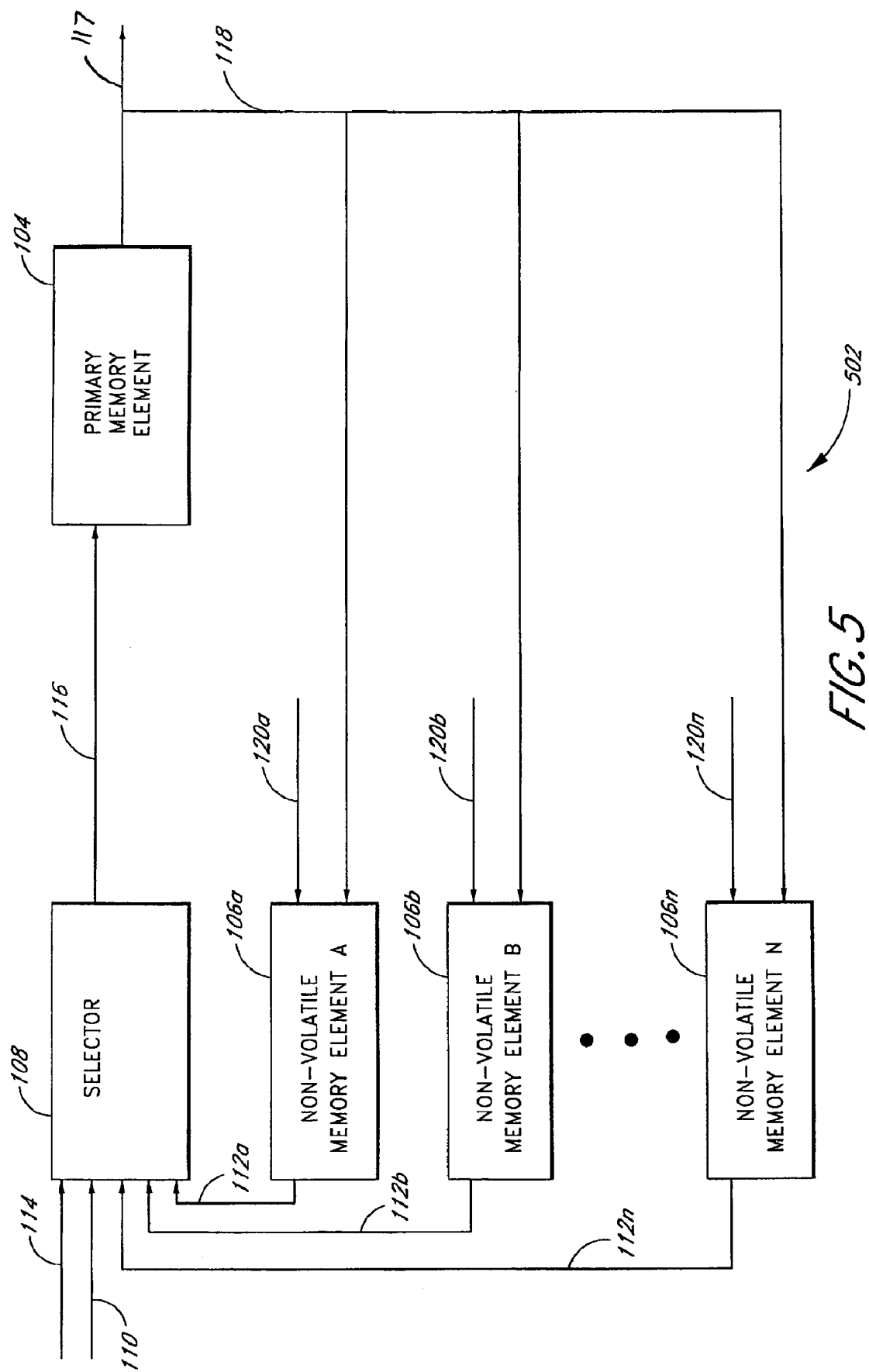

USE OF NON-VOLATILE MEMORY TO PERFORM ROLLBACK FUNCTION

CROSS-REFERENCE TO RELATED APPLICATION

This application is a continuation application of Ser. No. 11/434,497, filed May 15, 2006, now U.S. Pat. No. 7,272,747 issued on Sep. 18, 2007, which is a continuation application of U.S. application Ser. No. 10/188,724, filed Jul. 2, 2002, now U.S. Pat. No. 7,058,849 issued on Jun. 6, 2006, the entireties of which are hereby incorporated by reference herein.

BACKGROUND OF THE INVENTION

1. Field of the Invention

The present invention is related to checkpointing and error recovery in computer systems, particularly for fault tolerant computer systems.

2. Description of the Related Art

A fault which occurs during execution of machine instructions often renders data or subsequent execution of machine instructions invalid. Instead of halting operation entirely and restarting the execution of the program anew, it is preferable to recover from the fault and to continue processing the machine instructions with a minimum amount of disruption while preserving data and subsequent instructions. Techniques for recovering from faults have traditionally been achieved through the use of software and hardware.

Software recovery techniques are well known in the art. In a typical application, periodically, or upon the occurrence of specific events, software "checkpoints" the system by recording data adequate to restore the system to a known valid state. When the software detects a fault, the file modifications performed since the last checkpoint are undone, the computing system is "rolled back" to the most recent checkpoint, and operation of the system is resumed from that point.

Software techniques such as this are not transparent to an applications programmer because the programmer must carefully write checkpointing instructions into each application in order to record enough information to restore the application to a valid state. This requirement places a serious burden on the programmer and has impeded the widespread use of checkpointing as a means for achieving fault tolerance. In addition, since the scheme requires the programmer to select which information to record at each checkpoint and when to record the information, it is prone to human error. If the checkpoint code contains flaws, needed data may be overwritten or otherwise lost before proper recording.

In addition, checkpointing through software is very slow. When a fault occurs, certain software routines must be executed to diagnose the problem and to circumvent any permanently malfunctioning component of the computer. As a consequence, the resulting recovery time may preclude the use of this technique for achieving fault tolerance for some real-time applications where response times on the order of milliseconds or less are required. The layering of multiple applications further compounds this problem. Each application may have its own checkpointing subroutines, which, when layered (for example, a Java™ applet running inside a web browser running within an operating system) duplicate the checkpointing processes and substantially decrease the operating efficiency of the entire system.

Other methods for capturing data for checkpointing purposes have been proposed, for example, by Kirrmann (U.S. Pat. No. 4,905,196). Kirrmann's method involves a cascade of memory storage elements consisting of a main memory, followed by two archival memories, each of the same size as the main memory. Writes to the main memory are simultaneously copied into a write buffer. When it is time to establish a checkpoint, the buffered data is then copied by the processor first to one of the archival memories and then to the second. The two archival memories ensure that at least one of them contains a valid checkpoint. Some problems with this architecture include a triplication of memory, the use of slow memory for the archival memory and the effect on processor performance since the three memory elements are different ports on the same bus.

Other techniques have been developed to establish mirroring of data on disks rather than in main memory. U.S. Pat. No. 5,247,618 discloses one example of such a scheme. As a disk access is orders of magnitude slower than a main memory access, such schemes have been limited to mirroring data files, that is, to providing a backup to disk files should the primary access path to those files be disabled by a fault. No attempt is made to retain program continuity or to recover the running applications transparently to the users of the system. In some cases, it is not even possible to guarantee that mirrored files are consistent with each other, only that they are consistent with other copies of the same file.

Disk control systems have also been developed as an alternative method of checkpointing. Shimizu discloses one such system in U.S. Pat. No. 5,752,268. In Shimizu's system, when an operating system generates a write request to a disk device, both the write request and the associated write data are first stored into a nonvolatile memory whereupon a signal is sent to the operating system acknowledging the storage of the write request and write data in nonvolatile memory. Afterwards, the write request and write data are read from the nonvolatile memory and stored in the hard disk. As this architecture combines both hardware and software, it suffers from problems common to both the software and hardware checkpointing designs. The use of a slow disk drive for the archival memory can also decrease processor performance significantly. In addition, since the Shimizu scheme is not user transparent, it requires the programmer to select which information to record at each checkpoint and when to record the information. Consequently, this architecture is programmer intensive and prone to human error.

SUMMARY OF THE INVENTION

The preferred embodiments of this invention provide a device and method for maintaining, in a computer system, a consistent checkpoint state in the computer system's main memory which will remain fixed even in the event of a catastrophic fault or power failure. Advantageously, these embodiments can provide transparent fault recovery with minimum interaction with the operating system, quick recovery time, and minimum process throughput degradation. In some embodiments, during a checkpoint operation a large number of non-volatile memory elements may be simultaneously updated. Likewise, during rollback, a large number of primary memory elements may be restored.

In accordance with one aspect of the present invention, a memory system useful in the recovery from faults within a computing system is provided. The memory system is comprised of a primary memory element, one or more non-volatile solid-state memory elements which can be used to checkpoint data, and a selector which can be used to restore said checkpointed data.

In accordance with another aspect of the present invention, there has also been provided a computer system that, periodically or upon the occurrence of specific events, checkpoints a state of the computer system. Said checkpointed state can be later restored in order to provide fault-tolerant operation. In this embodiment, the computer system is comprised of a processor connected to a memory system. The processor is configured to selectively checkpoint its state as data in the memory system and is configured to selectively retrieve previously checkpointed state data from the memory system. The memory system includes a primary memory element, at least one magnetoresistive random access memory (MRAM) element connected to the primary memory element, and a selector making output from the MRAM element available for rollback functions.

In accordance with a third aspect of the present invention, there has also been provided a method for recovery from a fault detected within a computing system comprised of enabling at least one non-volatile solid-state memory element to store checkpointed data, recording the checkpointed data in the specified non-volatile memory element, and later rolling back the system state to the checkpointed data.

BRIEF DESCRIPTION OF THE DRAWINGS

These and other aspects of the invention will be readily apparent from the description below and the appended drawings, which are meant to illustrate and not to limit the invention, and in which:

FIG. 5 is a schematic illustration of a memory system with multiple magneto-resistive memory elements in accordance with another embodiment of the present invention.

DETAILED DESCRIPTION OF THE PREFERRED EMBODIMENTS

Embodiments of the present invention provide a device and method for maintaining, in a computer system, a consistent checkpoint state in the computer system's main memory which will remain fixed even in the event of a catastrophic fault or power failure. In embodiments of the present invention, fault recovery is transparent to application software operating in the computing system. The invention provides recovery with minimum interaction with the operating system, quick recovery time, and minimum process throughput degradation.

In the prior art, data has been checkpointed through main memory and on hard disks. Traditional methods, however, have a few distinct disadvantages. For example, in the event of power failure, any data checkpointed in traditional main memory would be lost. In addition, methods whereby checkpointed data is stored on a hard disk are orders of magnitude slower than checkpointing to main memory. The present invention solves both of these problems and provides an apparatus and method for checkpointing data such that it is as efficient and fast as main memory checkpointing, while maintaining the longevity of checkpointing to hard disk.

The present invention will be more completely understood through the following detailed description, which should be read in conjunction with the attached drawings. In this description, like numbers refer to similar elements within various embodiments of the present invention. In addition, unless otherwise stated, connections between the elements within the following embodiments may be direct (i.e. an uninterrupted electrical connection) or indirect (i.e. an electrical connection by way of one or more additional elements within the system).

Figure 1:
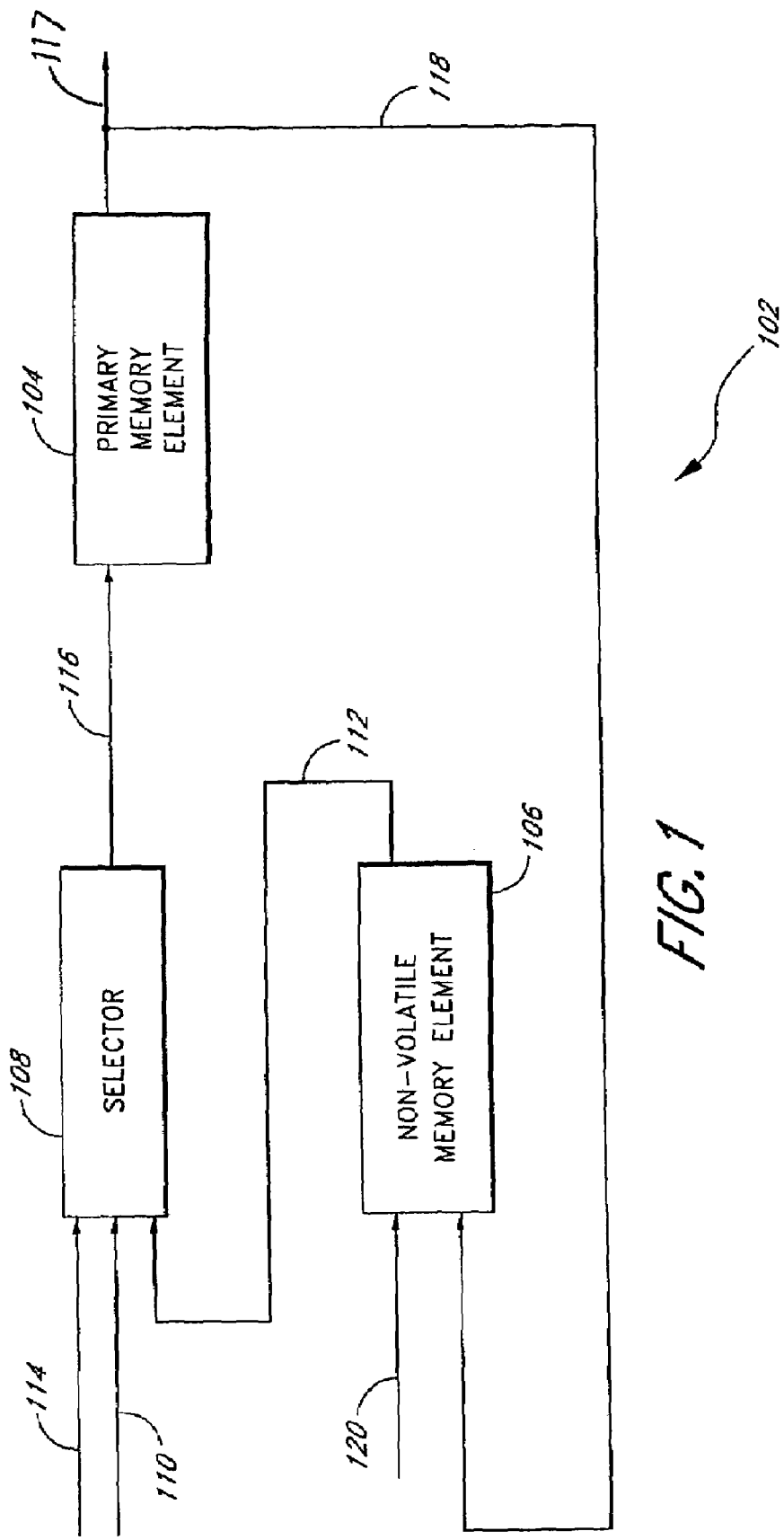
FIG. 1 is a schematic illustration of a memory system in accordance with one embodiment of the present invention.

FIG. 1 shows a memory system according to the present invention generally designated as 102. The memory system 102 includes a primary memory element 104, a non-volatile solid-state memory element 106 and a selector 108.

The selector 108 has at least three inputs and at least one output. Line 110 is used for data input into the selector 108. Line 112 is also used for data input, and is connected to a data output on the non-volatile solid-state memory element 106. A rollback enabler 114 is connected to any mechanism suitable for determining the output of the selector. Line 116 is connected to the input for primary memory element 104. The selector 108 can be any multiplexor, switch, or similar device. In this embodiment, the selector 108 is a 2:1 multiplexor.

The non-volatile solid-state memory element 106 has at least two inputs and at least one output. In this embodiment, line 118 is used for data input to the non-volatile solid-state memory element 106 and is connected to the output line 117 of the primary memory element 104. A checkpoint enabler 120 is connected to any mechanism, such as a processor, suitable for forcing the non-volatile solid-state memory element 106 to store checkpointed data. Line 112 is used for data output from the non-volatile solid-state memory element 106, and in this embodiment, is also used as an input to the selector 108.

Preferably, the non-volatile solid-state memory element 106 is an integrated circuit memory element or a magnetoresistive random access memory (MRAM) element. One exemplary design for an MRAM element is disclosed in U.S. Pat. No. 5,966,322, the entire disclosure of which is hereby incorporated by reference.

The primary memory element 104 has at least one input and at least one output. The input to the primary memory element 104 is connected to the selector output by line 116. Line 117 is used for data output from the primary memory element and also the entire memory system 102. Line 117 is also connected to Line 118, which in turn is connected to the input for non-volatile solid-state memory element 106. In this embodiment, the primary memory element 104 is an integrated circuit element, preferably a volatile random access memory element commonly found in computer systems. For example, the primary memory element 104 may be a flip-flop, a dynamic random access memory (DRAM) element or a synchronous dynamic random access memory (SDRAM) element, as are commonly used in a computer in conjunction with a permanent storage device such as a hard disk drive.

The operation of this embodiment is described with reference to FIG. 1. Data is made available to the selector 108 through input 110. In its default setting, the selector 108 allows data from its input on line 110 to flow to its output on line 116. This data is then stored in the primary memory element 104 and is made available on line 117.

To checkpoint data, a signal is sent to the checkpoint enabler 120. When the checkpoint enabler 120 is triggered, the non-volatile solid-state memory element 106 stores the data available on its input line 118, and makes that checkpointed data available on its output line 112.

In order to retrieve the checkpointed data, a signal is sent to the rollback enabler 114. When the rollback enabler 114 is triggered, the selector 108 allows the checkpointed data from its input line 112 to flow to its output line 116. This checkpointed data is then stored in the primary memory element 104 and is made available on line 117.

Figure 2:
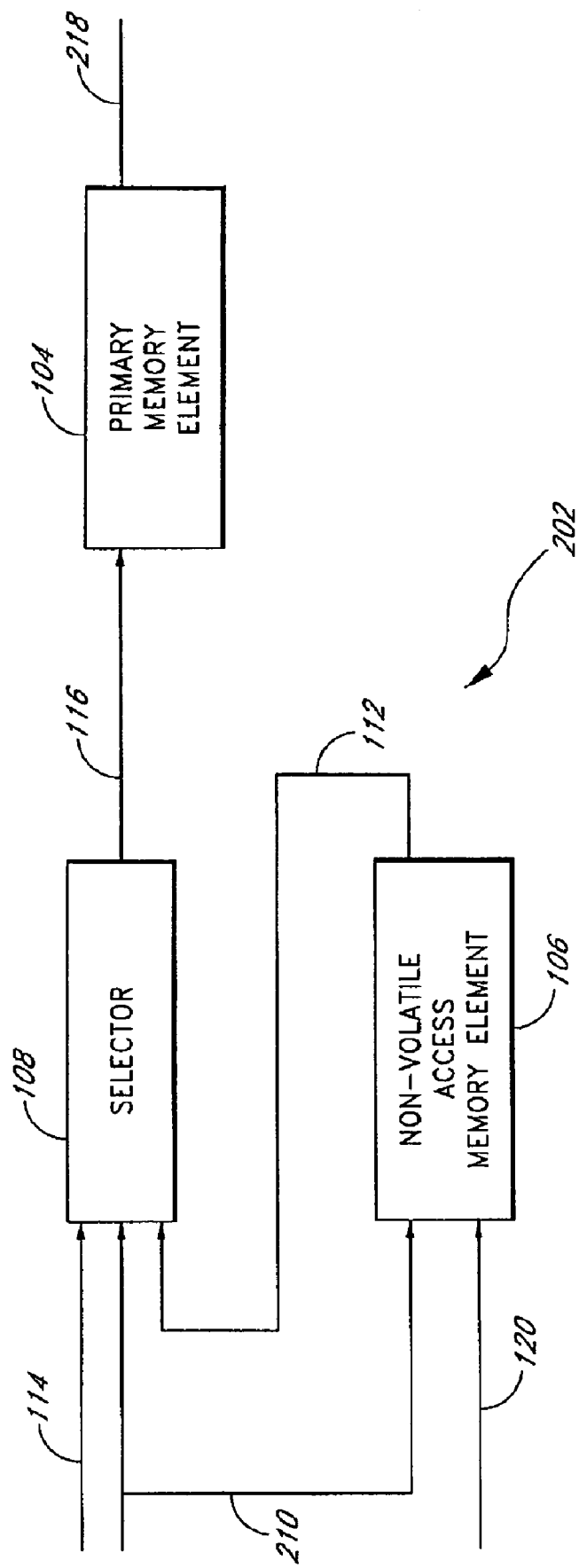
FIG. 2 is a schematic illustration of a memory system in accordance with another embodiment of the present invention.

FIG. 2. depicts a second embodiment of the present invention generally designated as 202. In the second embodiment, input line 210 serves as both the input line to the selector 108 and to the non-volatile solid-state memory element 106.

The operation of this embodiment is described with reference to FIG. 2. Data is made available to both the selector 108 and the non-volatile solid-state memory element 106 through input 210. In its default setting, the selector 108 allows data from its input on line 210 to flow to its output on line 116. This data is then stored in the primary memory element 104 and is made available on line 218.

To checkpoint data, a signal is sent to the checkpoint enabler 120. When the checkpoint enabler 120 is triggered, the non-volatile solid-state memory element 106 stores the data available on its input line 210, and makes that checkpointed data available on its output line 112.

In order to retrieve the checkpointed data, a signal is sent to the rollback enabler 114. When the rollback enabler 114 is triggered, the selector 108 allows the checkpointed data from its input line 112 to flow to its output line 116. This checkpointed data is then stored in the primary memory element 104 and is made available on line 218.

Figure 3:
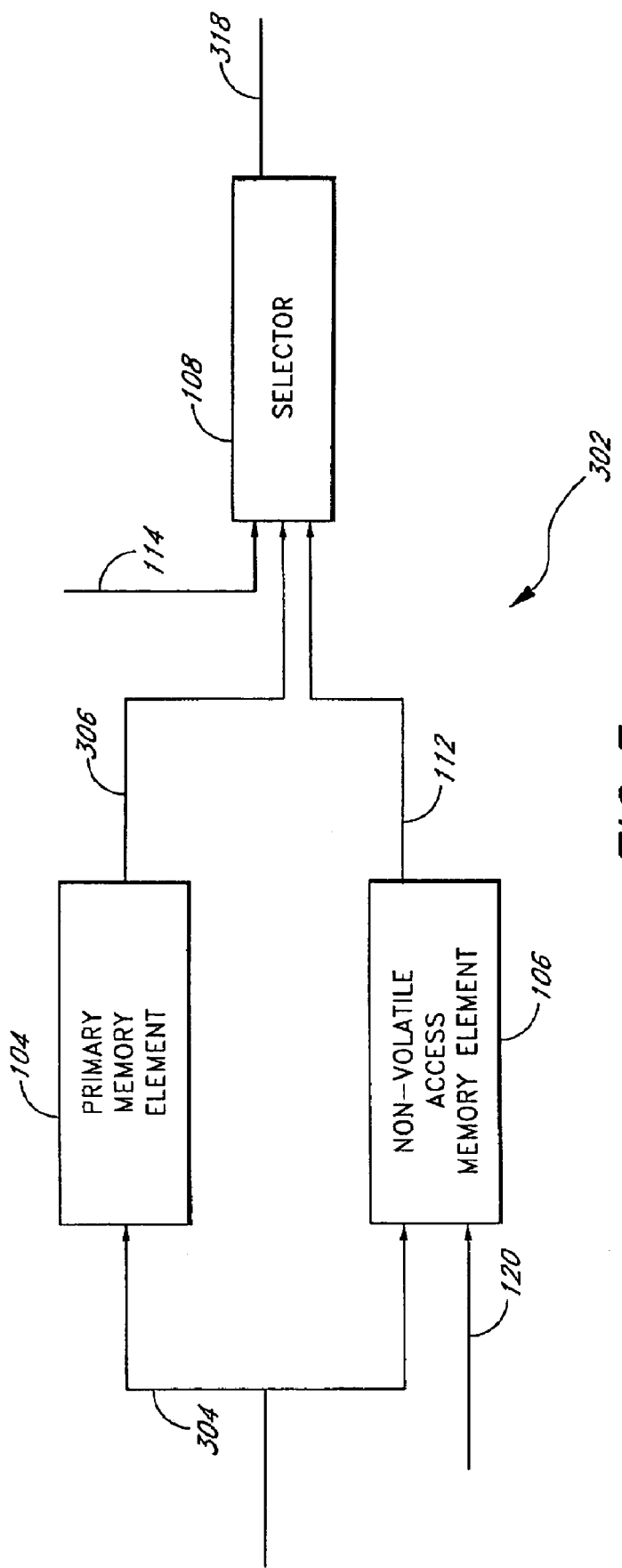
FIG. 3 is a schematic illustration of a memory system in accordance with another embodiment of the present invention.

FIG. 3. depicts a third embodiment of the present invention generally designated as 302. In the third embodiment, the primary memory element 104 and the non-volatile solid-state memory element 106 are connected in parallel, and the selector 108 chooses data from these elements' respective outputs.

The operation of the third embodiment is described with reference to FIG. 3. Data is made available to both the primary memory element 104 and the non-volatile solid-state memory element 106 through line 304. Data is stored in primary memory element 104 and is made available on its output line 306. In its default setting, the selector 108 allows data from its input line 306 to flow to its output line 318.

To checkpoint data, a signal is sent to the checkpoint enabler 120. When the checkpoint enabler 120 is triggered, the non-volatile solid-state memory element 106 stores the data available on its input line 304, and makes that checkpointed data available on its output line 112.

In order to retrieve the checkpointed data, a signal is sent to the rollback enabler 114. When the rollback enabler 114 is triggered, the selector 108 allows the checkpointed data from its input line 112 to flow to its output line 318.

Figure 4:
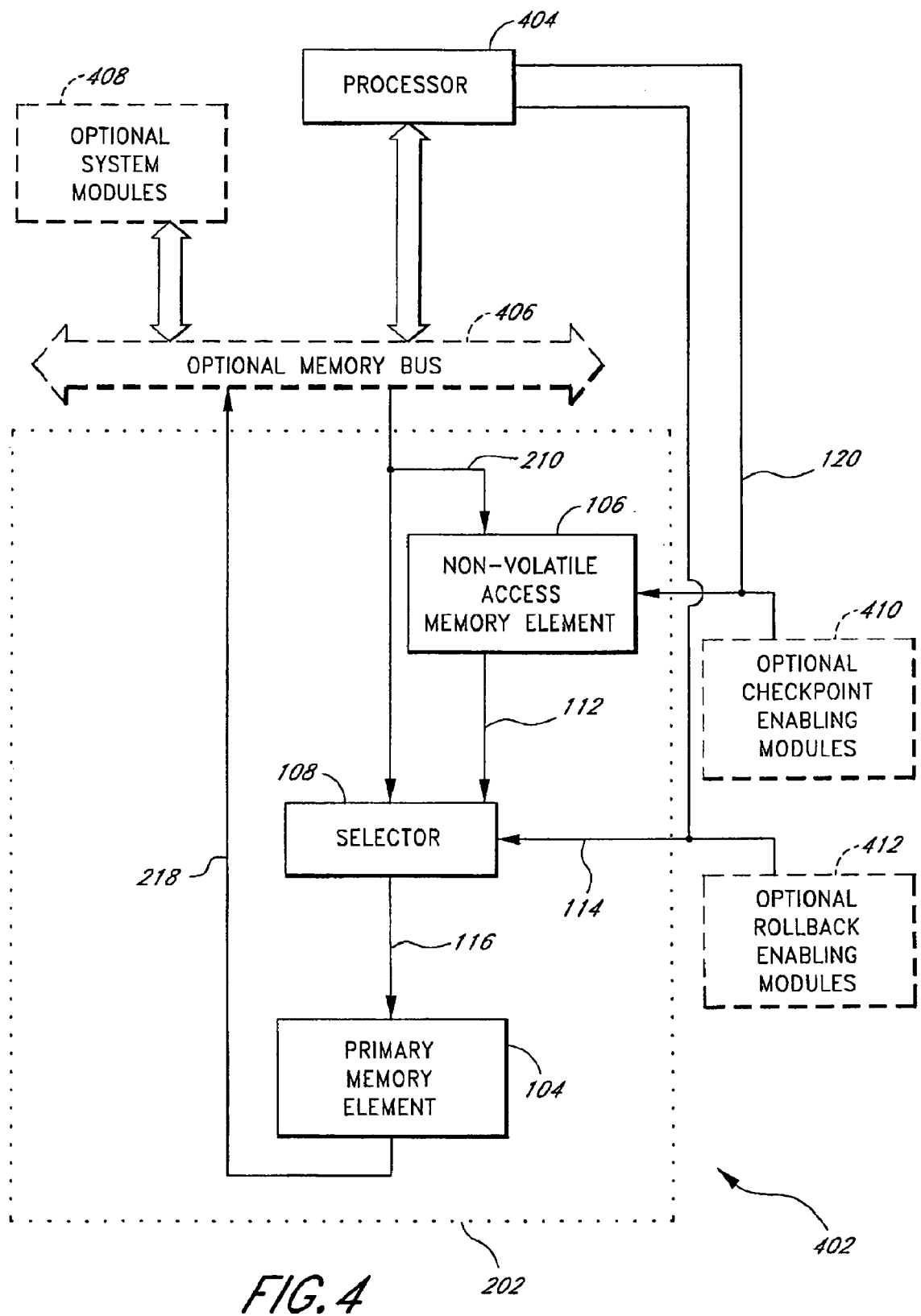
FIG. 4 is a block diagram of a computer system in accordance with an alternate embodiment of the present invention.

FIG. 4 shows a block diagram of a computer system 402 in accordance with an embodiment of the present invention. Preferably, the computer system 402 includes at least one processor 404 which is connected to the memory system 202 directly or indirectly through a memory bus 406. The optional system modules 408, can also be included in the computer system 402. The optional system modules 408 can include, for example, additional processors, input/output (I/O) subsystems, caches, etc. In another embodiment, the computer system 402 can also include checkpoint enabling modules 410 and rollback enabling modules 412. The checkpoint enabling modules 410 include hardware capable of instructing the memory system 202 to checkpoint data. The rollback enabling modules 412 include hardware capable of instructing the memory system 202 to rollback to the checkpointed data. Through use of checkpoint enabling modules 410, the system may be checkpointed without requiring a checkpoint instruction to be sent from the processor 404. Likewise, through the use of rollback enabling modules 412, the system may be rolled back without requiring a rollback instruction to be sent from the processor 404.

The operation of this embodiment is described with reference to FIG. 4. The processor writes system data to the memory bus 406 where it can be read by both the selector 108 and the non-volatile solid-state memory element 106 through line 210. In its default setting, the selector 108 allows the system data from its input line 210 to flow to its output line 116. This data is then stored in the primary memory element 104 and is made available on line 218.

Periodically, or upon the occurrence of specific events, the processor 404 or one of the optional system modules 408 can checkpoint system data so that in the event of a fault or system failure, the system may be restored into a state known to be correct. To checkpoint system data, the processor 404 or one of the checkpoint enabling modules 410 sends a signal to the checkpoint enabler 120. When the checkpoint enabler 120 is triggered, the non-volatile solid-state memory element 106 stores the system data available on its input line 210, whereupon such system data becomes checkpointed system data. The non-volatile solid-state memory element 106 then makes the checkpointed system data available on its output line 112.

In order to retrieve the checkpointed system data, the processor 404 or one of the checkpoint enabling modules 410 sends a signal to the rollback enabler 114. When the rollback enabler 114 is triggered, the selector 108 allows the checkpointed system data from its input line 112 to flow to its output line 116. This checkpointed system data is then stored in the primary memory element 104 and flows through its output line 218 to the memory bus 406. The processor 404 and any of the optional system modules 408 can then read the checkpointed data, and the entire computer system 402 will be restored to a stable state.

FIG. 5 depicts a memory system, generally designated as 502, with multiple magneto-resistive memory elements in accordance with another embodiment of the present invention. The memory system 502 includes a primary memory element 104, a selector 108 and a plurality of non-volatile solid-state memory elements 106a through 106n. Memory system 502 is provided to illustrate how a number of non-volatile solid-state memory elements 106a-106n can be substituted for non-volatile solid-state memory element 106 in any of memory systems 102, 202 and 302 as depicted in FIGS. 1-4.

The operation of this embodiment is described with reference to FIG. 5. Data is made available to the selector 108 through input 110. In its default setting, the selector 108 allows data from its input on line 110 to flow to its output on line 116. This data is then stored in the primary memory element 104 and is made available on line 117.

To checkpoint data in a first instance, a signal is sent to a first checkpoint enabler 120a of a first non-volatile memory element 106a. When the checkpoint enabler 120a is triggered, the non-volatile solid-state memory element 106a stores the data available on its input line 118, and makes that checkpointed data available on its output line 112a.

To checkpoint data in a second instance, a signal is sent to a second checkpoint enabler 120b of a second non-volatile memory element 106b. When the checkpoint enabler 120b is triggered, the non-volatile solid-state memory element 106b stores the data available on its input line 118, and makes that checkpointed data available on its output line 112b. In this fashion, checkpointed data may be stored in a number of non-volatile solid-state memory elements 106a-106n.

In order to retrieve checkpointed data, a signal is sent to the rollback enabler 114 designating which non-volatile solid state memory element 106a-106n to retrieve checkpointed data from. When the rollback enabler 114 is triggered, the selector 108 chooses the checkpointed data from a specified input line 112a-112n corresponding to the designated non-volatile solid state memory element 106a-106n. This checkpointed data is then stored in the primary memory element 104 and is made available on line 117. In this fashion, checkpointed data may be retrieved from a number of non-volatile solid-state memory elements 106a-106n and used to rollback the computer system 402 (depicted in FIG. 4) to any previously checkpointed state. This functionality would enable embodiments of the present invention to be used in checkpointing and rolling back to different states of the computer system, corresponding to different times or different versions of the system.

Given the embodiments of the invention described herein, it should be apparent to those skilled in the art that the foregoing is merely illustrative and not limiting, having been presented by way of example only. Numerous modifications and other embodiments are within the scope of one of ordinary skill in the art and are contemplated as falling within the scope of the invention as defined by the appended claims and equivalents thereto.

I claim:

1. A method for checkpointing data in an electronic device, the method comprising:
    storing received data in at least a volatile memory element based at least partly on a first command to store data in the electronic device;
    storing received data in a non-volatile magnetoresistive random access memory (MRAM) element based at least partly on a checkpoint enabler command; and
    selecting between data retrieved from the MRAM element and data retrieved from the volatile memory element based at least partly on a rollback enabler command for data for the electronic device, wherein selecting is performed by a hardware selector coupled to the volatile memory element and to the MRAM element.

2. The method as defined in claim 1, wherein the received data is read from a data bus.

3. The method as defined in claim 1 wherein the hardware selector is configured to select the output of the volatile memory element for the output of the hardware selector when the rollback enabler command is not asserted.

4. The method as defined in claim 1 wherein the volatile memory element is a volatile flip-flop.

5. The method as defined in claim 1 wherein the volatile memory element is a dynamic random access memory (DRAM) element.

6. The method as defined in claim 1 wherein the volatile memory element and the MRAM element are embodied in a memory chip.

7. The method as defined in claim 1 wherein the volatile memory element and the MRAM element are embodied in an integrated circuit.

8. A method for checkpointing data in an electronic device, the method comprising:
    selecting between received data and data retrieved from a non-volatile magnetoresistive random access memory (MRAM) element based at least partly on a rollback enabler command, wherein selecting is performed by a hardware selector coupled to the MRAM element;
    storing the selected data in a volatile memory element based at least partly on a first command to store data in the electronic device; and
    providing data from the volatile memory element for data for the electronic device.

9. The method as defined in claim 8, further comprising retrieving data from the volatile memory element and storing the retrieved data in the MRAM element at based at least partly on a checkpoint enabler command.

10. The method as defined in claim 8, further comprising selecting between received data and data from one of a plurality of MRAM elements at least partly based on the rollback enabler command, wherein at least one of the plurality of MRAM elements has data stored from the volatile memory element.

11. The method as defined in claim 8 wherein the volatile memory element is a volatile flip-flop.

12. The method as defined in claim 8 wherein the volatile memory element is a dynamic random access memory (DRAM) element.

13. The method as defined in claim 8 wherein the volatile memory element and the MRAM element are embodied in a memory chip.

14. The method as defined in claim 8 wherein the volatile memory element and the MRAM element are embodied in an integrated circuit.

* * * * *